United States Patent
Chou

(10) Patent No.: US 7,558,090 B2
(45) Date of Patent: Jul. 7, 2009

(54) SYSTEM FOR TRANSFERRING AN ALTERNATING VOLTAGE INTO A DIRECT VOLTAGE

(75) Inventor: Chienning Chou, Taipei (TW)

(73) Assignee: Elementech International Corporate Ltd. (TW)

( * ) Notice: Subject to any disclaimer, the term of this patent is extended or adjusted under 35 U.S.C. 154(b) by 119 days.

(21) Appl. No.: 11/798,969

(22) Filed: May 18, 2007

(65) Prior Publication Data

US 2008/0232140 A1   Sep. 25, 2008

(30) Foreign Application Priority Data

Mar. 23, 2007   (TW) .............................. 96110103 A

(51) Int. Cl.
    H02H 7/122   (2006.01)
(52) U.S. Cl. .................... 363/56.01; 363/37; 363/56.11
(58) Field of Classification Search .................. 363/16, 363/18, 19, 56.1, 56.11, 56.12, 37, 79, 97
    See application file for complete search history.

(56) References Cited

U.S. PATENT DOCUMENTS

| | | | | |
|---|---|---|---|---|
| 4,469,988 A | * | 9/1984 | Cronin | .................... 315/209 R |
| 4,758,937 A | * | 7/1988 | Usui et al. | .................... 363/19 |
| 5,608,295 A | * | 3/1997 | Moisin | ........................ 315/247 |
| 6,650,070 B1 | * | 11/2003 | Hudson et al. | ............... 315/312 |

* cited by examiner

*Primary Examiner*—Jessica Han
(74) *Attorney, Agent, or Firm*—Bacon & Thomas, PLLC

(57) ABSTRACT

A system for transferring an alternating voltage into a direct voltage includes a rectifier, a filter, a transformer, a switch, a switch control circuit and a voltage feedback circuit. The rectifier connects to a main power supply device and rectifies the alternating voltage into a transient direct voltage. The filter filters out a noise from the transient direct voltage and produces a filtering direct voltage. The transformer transfers the filtering direct voltage into a working direct voltage. The switch which has a turn-on status and a cutoff status is used to control the current which goes through the transformer. The switch control circuit is used to control the switch be in the turn-on status or the cutoff status. The voltage feedback circuit drives the switch controlling circuit in accordance with the transformer's voltage and diminishes a switching loss from the switch.

9 Claims, 5 Drawing Sheets

US 7,558,090 B2

SYSTEM FOR TRANSFERRING AN ALTERNATING VOLTAGE INTO A DIRECT VOLTAGE

BACKGROUND OF THE INVENTION

1. Field of the Invention

The present invention relates to the technical field of switching power supply, and more particularly, to a system for transferring an alternating voltage into a direct voltage.

2. Description of the Related Art

Since the electrical technologies have developed rapidly, the application of the wireless network might be appeared in various hand-held devices. In the hand-held device, like a mobile phone, a PDA or a digital camera, a power supply is prerequisite standard equipment. The hand-held devices might be charged or used with a power supply. In the prior art, a linear power supply is used to charge the various hand-held devices typically. However, the transform efficiency of the linear power supply is very low and the swing of the input voltage is small. In generally, the input voltage swing is about ±10% of the input voltage.

To overcome the problem of the linear power supply, a high-frequency switching power supply can raise the transform efficiency for transferring the alternating voltage into the direct voltage. FIG. 1 is a circuit diagram of a typical switching power supply. As shown in FIG. 1, when a power MOSFET 110 is in turn-on state, the input voltage Vi would be supplied to a primary winding 121 of a transformer 120. The current of the primary winding 121 would increase gradually and store the energy in the primary winding 121, and then induct the energy to a secondary winding 122 of the transformer 120. When the power MOSFET 110 is in cutoff state, the current $I_D$ which goes through the power MOSFET 110 will be overlapped with the voltage $V_D$ of the power MOSFET 110 in time domain and a switching loss would be produced. FIG. 2 is schematic view of a switching loss of the switching power supply. As shown in FIG. 2, the current $I_D$ waveform of the power MOSFET 110 is overlapped with the voltage $V_D$ waveform. The overlapped area is the switching loss. The switching loss not only wastes energy, but also decreases the transform efficiency.

Therefore, it is desirable to provide a system for transferring an alternating voltage into a direct voltage to mitigate and/or obviate the aforementioned problems.

SUMMARY OF THE INVENTION

The object of the invention is to provide a system for transferring an alternating voltage into a direct voltage to decrease the switching loss to save energy and increase the transform efficiency.

In accordance with one aspect of the invention, there is provided a system for transferring an alternating voltage into a direct voltage. The system comprises a rectifier, a filter, a transformer, a switch, a switch control circuit and a voltage feedback circuit. The rectifier is connected to a main power supply device to rectify the alternating voltage outputted from the main power supply into a transient direct voltage. The filter is connected to the rectifier to filter out a noise from the transient direct voltage for producing a filtered direct voltage. The transformer is connected to the filter to transfer the filtered direct voltage into a worked direct voltage. The switch is connected to the transformer, and the switch has a turn-on status and a cutoff status to control a current which goes through the transformer. The switch control circuit is connected to the switch to control the switch be in the turn-on status or the cutoff status. The voltage feedback circuit is connected to the transformer and the switch control circuit, and the voltage feedback circuit is used to drive the switch controlling circuit in accordance with the transformer's voltage and reduces a switching loss of the switch.

These and other novel features of the invention will become more apparent from the following detailed description when taken in conjunction with the accompanying drawings.

DETAILED DESCRIPTION OF THE PREFERRED EMBODIMENT

Figure 1:
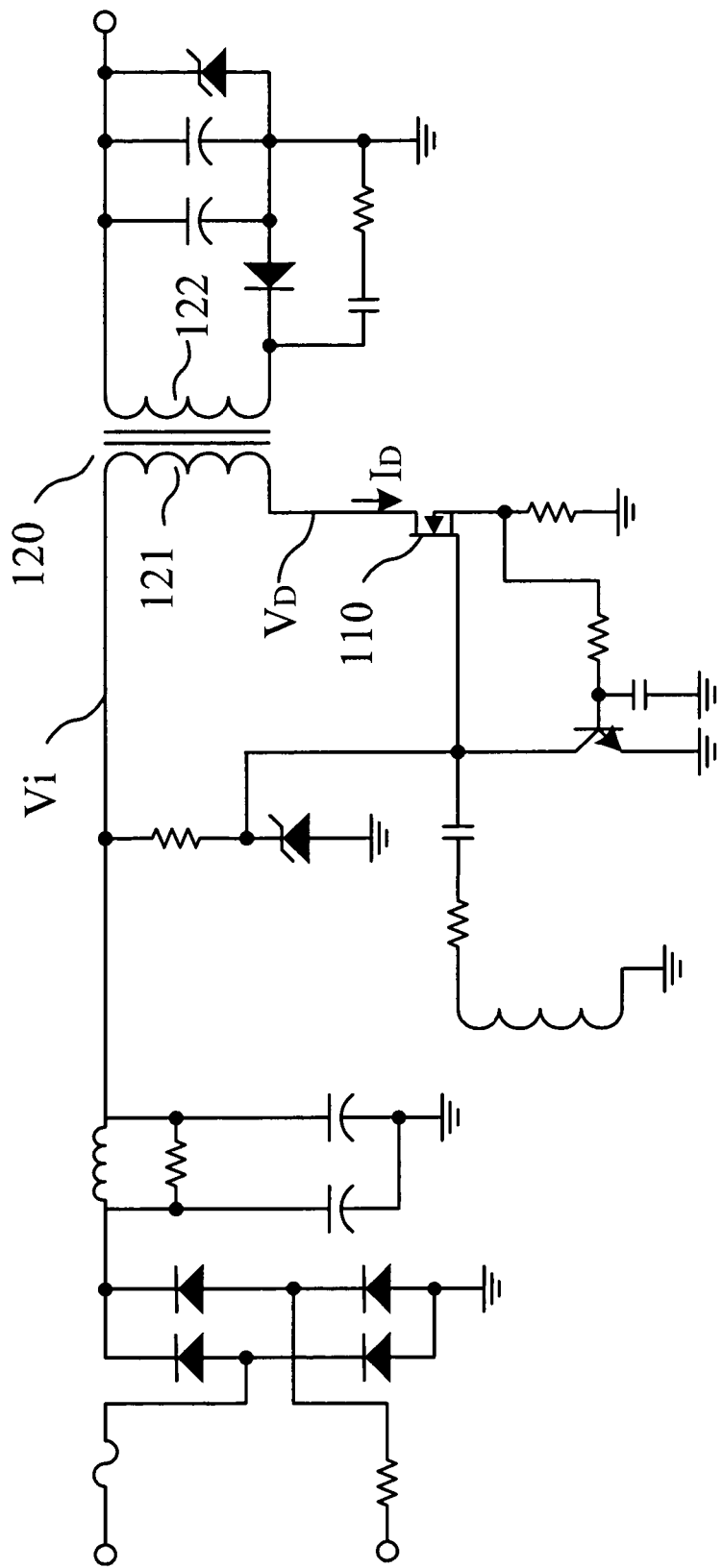
FIG. 1 is a circuit diagram of a typical switching power supply.
Figure 2:
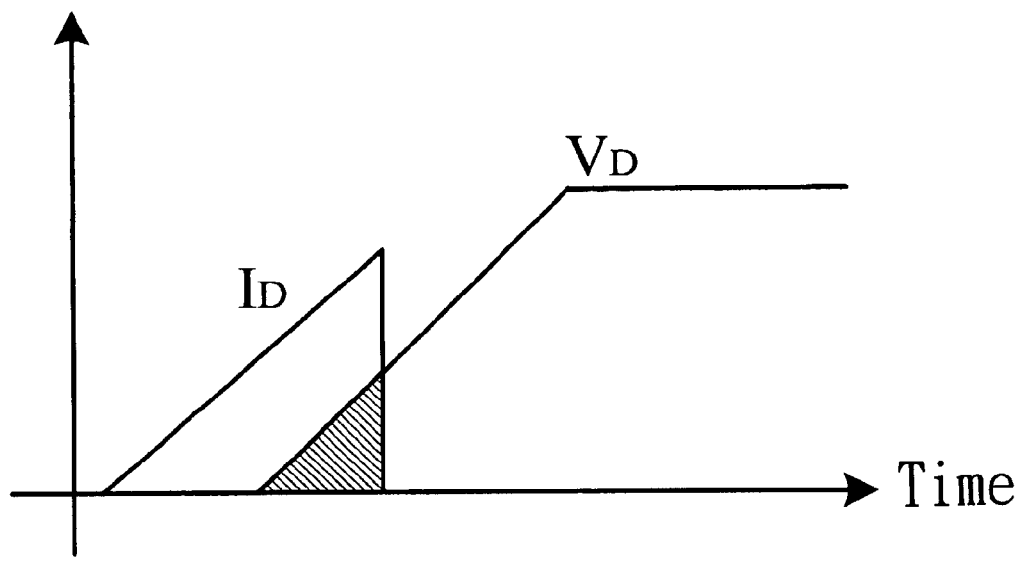
FIG. 2 is schematic view of a switching loss of the switching power supply.
Figure 3:
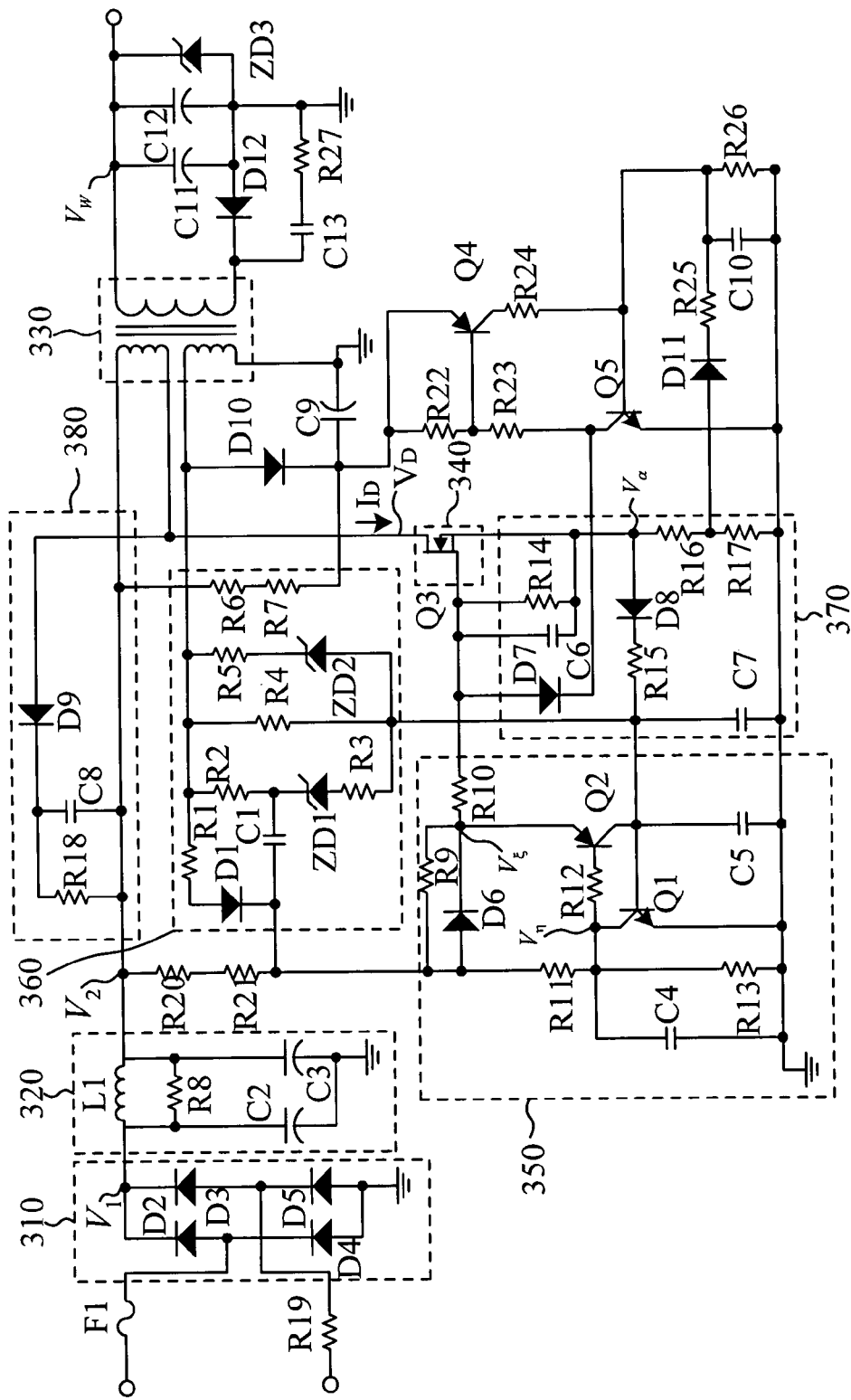
FIG. 3 is a circuit diagram of a system for transferring an alternating voltage into a direct voltage in accordance with the present invention.

Please refer to FIG. 3. FIG. 3 is a circuit diagram of a system for transferring an alternating voltage into a direct voltage in accordance with the present invention. The system comprises a rectifier 310, a filter 320, a transformer 330, a switch 340, a switch control circuit 350, a voltage feedback circuit 360, a current detected circuit 370, and a clamp circuit 380.

The rectifier 310 is connected to a main power supply (not shown) and is used to rectify the alternating voltage which outputted from the main power supply into a transient direct voltage $V_1$. The rectifier 310 is a bridge rectifier and comprises a second to a fifth diode (D2, D3, D4, and D5).

The filter 320 is connected to the rectifier 310 and is used to filter out a noise from the transient direct voltage to produce a filtered direct voltage $V_2$. The filter 320 is a Butterworth filter and comprises an eighth resistance R8, a second capacitance C2, a third capacitance C3, and a first inductance L1.

The transformer 330 is connected to the filter 320 and is used to transfer the filtered direct voltage $V_2$ into a worked direct voltage $V_W$.

The switch 340 is connected to the transformer 330 and is preferred to be a power NMOS transistor. The switch 340 which has a turn-on status and a cutoff status, and the switch 340 is used to control the current which goes through the transformer 330. When the switch 340 is in the turn-on status, the current in the primary winding of the transformer 330 would increase gradually and goes through the switch 340.

When the switch 340 is in the cutoff status, the current in the primary winding of the transformer 330 would decrease to 0 ampere.

The switch controlling circuit 350 is connected to the switch 340 and is used to control the switch 340 to be in the turn-on status or the cutoff status. The switch controlling circuit 350 comprises a sixth diode D6, a ninth to a thirteenth resistance R9~R13, a forth and a fifth capacitance C4~C5, and a first and a second transistor Q1~Q2. Wherein, the first transistor Q1 is a NPN transistor; the second transistor Q2 is a PNP transistor.

The voltage feedback circuit 360 is connected to the transformer 330 and the switch controlling circuit 350. The voltage feedback circuit 360 is used to drive the switch controlling circuit 350 in accordance with the voltage of the transformer 340 and reduce a switching loss from the switch 340.

The voltage feedback circuit 360 comprises a first diode D1, a first and a second Zener diode ZD1~ZD2, a first capacitance C1, and a first to a seventh resistance R1~R7. The first Zener diode ZD1 and the second Zener diode ZD2 has a breakdown voltage $V_{ZD1}$ and $V_{ZD2}$, respectively. Wherein, the breakdown voltage $V_{ZD1}$ of the first Zener diode ZD1 is larger than the breakdown voltage $V_{ZD2}$ of the second Zener diode ZD2.

When the voltage of the transformer 330 is larger than the breakdown voltage $V_{ZD2}$, the second Zener diode ZD2 will turn on. In that way, the first transistor Q1 will be in the saturation region such that a $V_\eta$ will be in low voltage. In generally, the voltage of the $V_\eta$ is about 0.2~0.3 volts. The second transistor Q2 will be in the saturation region because of the $V_\eta$ being in low voltage, and then the $V_\zeta$ will be in low voltage. Then the switch 340 will be in cutoff status and decrease the switching loss.

When the voltage of the transformer 330 is larger than the breakdown voltage $V_{ZD1}$, it means the voltage of the transformer 330 is more over than a pre-determined voltage. In accordance with the technology of the present invention, the first Zener diode ZD1 and second Zener diode ZD2 are turn-on. In that way, the first transistor Q1 will be in the saturation region accelerative, then the $V_\eta$ will be in low voltage. Then the switch 340 will be in cutoff status and decrease the switching loss.

The current testing circuit 370 is connected to the switch 340 and the switch controlling circuit 350. The current detected circuit 370 comprises a seventh and an eighth diode D7~D8, a fourteenth to a seventeenth resistance R14~R17, and a sixth to a seventh capacitance C6~C7. The current detected circuit 370 is used to drive the switch controlling circuit 350 in accordance with a current $I_D$ of the switch 340 and control the switch 340 to be in the turn-on status or the cutoff status.

When the voltage of the transformer 330 is increasing, the current which goes through the switch 340 will increase, and then the voltage $V_\alpha$ will also increase. When the voltage $V_\alpha$ is larger than a default voltage, the first transistor Q1 will be in saturation region, and then the voltage $V_\eta$ will be in low voltage. The second transistor Q2 will be in the saturation region because of the $V_\eta$ being in low voltage, and then the $V_\zeta$ will be in low voltage. Then the switch 340 will be in cutoff status.

The clamp circuit 380 is connected to the transformer 330 and the filter 320 and is used to clamp a primary coil voltage of the transformer 330 to a default value. The clamp circuit 380 comprises a ninth diode D9, an eighteenth resistance R18, and an eight capacitance C8.

Figure 4:
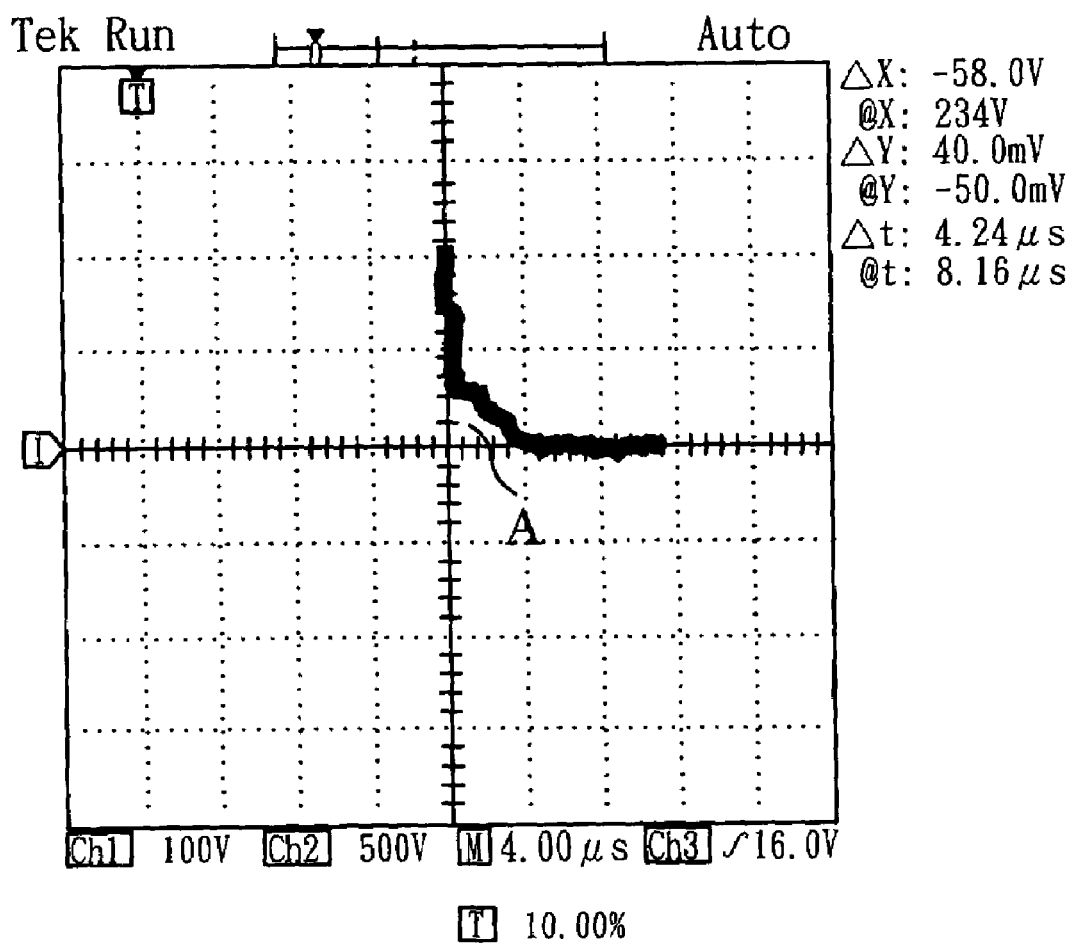
FIG. 4 is schematic view of a current-voltage of the switch in the prior art.

Please refer to FIG. 4. FIG. 4 is schematic view of a current-voltage of the switch in the prior art. The drawing shows the current $I_D$ and the voltage $V_D$ of the power MOSFET 110 measured by an oscilloscope. As shown in FIG. 4, the horizontal axis of the oscilloscope is the voltage $V_D$ of the power MOSFET 110, and the vertical axis is the current $I_D$ of the power MOSFET 110. When the power MOSFET 110 is in cutoff status, the current $I_D$ will decrease to 0 ampere, and then the voltage $V_D$ will increase. The area under the curve (As signed at A) is the switching loss.

Figure 5:
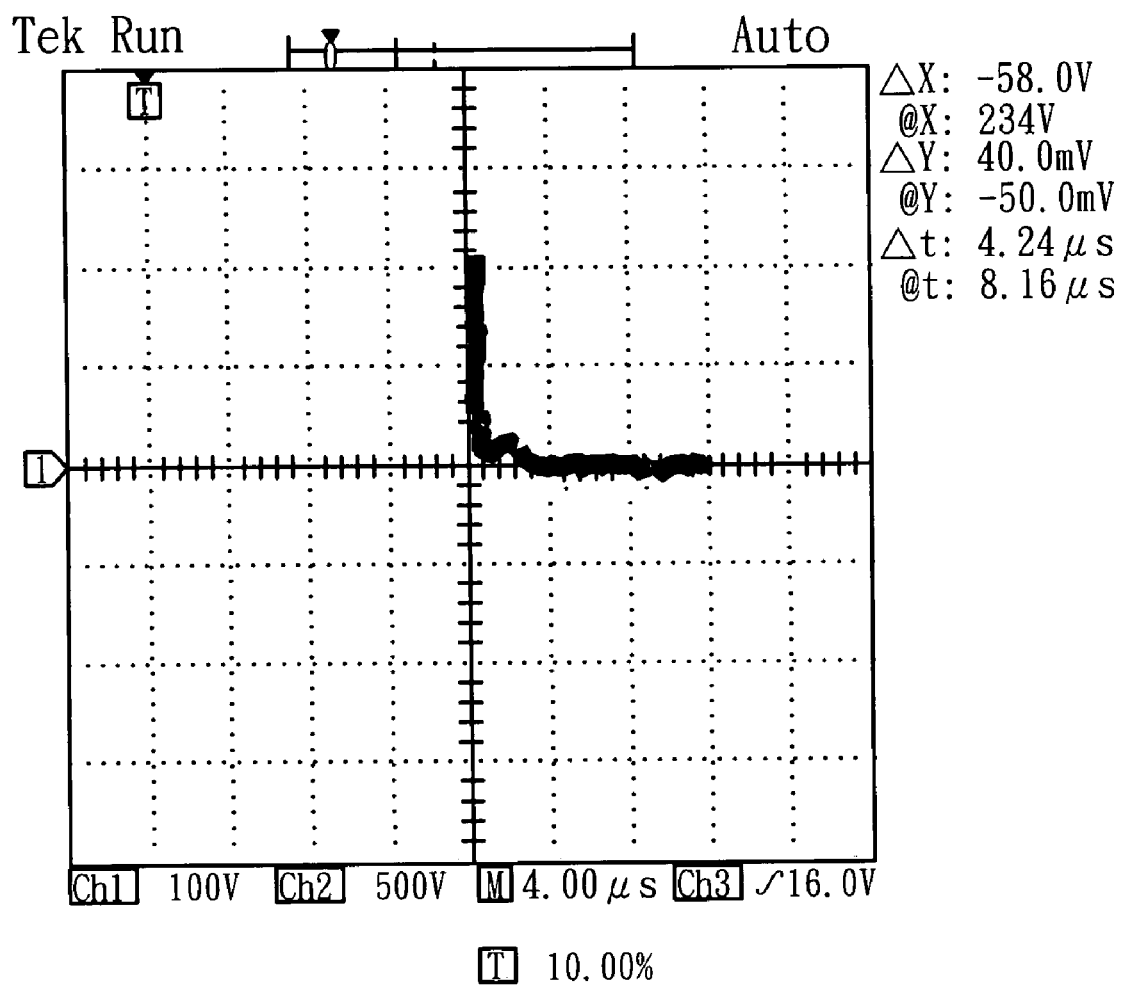
FIG. 5 is schematic view of a current-voltage of the switch of the present invention.

Please refer to FIG. 5. FIG. 5 is schematic view of a current-voltage of the switch of the present invention. The drawing shows the current $I_D$ and the voltage $V_D$ of the switch 340 measured by the oscilloscope. Comparing FIG. 4 with FIG. 5, the switching loss in the present invention is smaller than the switching loss in the prior art.

In view of the foregoing, it is known that when the voltage of the transformer 330 is larger than the breakdown voltage $V_{ZD2}$, the voltage feedback circuit 360 makes the switch 340 be in cutoff status to decrease the switching loss. When the voltage of the transformer 330 is increasing continuously and large than the breakdown voltage $V_{ZD1}$, the voltage feedback circuit 360 will make the first transistor Q1 be in saturation region accelerative. Then the switch 340 will be in cutoff status accelerative and decrease switching loss. Comparing to the technology in the prior art, the present invention could decrease the switching loss thus saving energy and increasing the transform efficiency.

Although the present invention has been explained in relation to its preferred embodiment, it is to be understood that many other possible modifications and variations can be made without departing from the spirit and scope of the invention as hereinafter claimed.

What is claimed is:

1. A system for transferring an alternating voltage into a direct voltage, comprising:
   a rectifier connected to a main power supply device to rectify the alternating voltage outputted from the main power supply into a transient direct voltage;
   a filter connected to the rectifier to filter out a noise from the transient direct voltage for producing a filtered direct voltage;
   a transformer connected to the filter to transfer the filtered direct voltage into a worked direct voltage;
   a switch connected to the transformer, the switch has a turn-on status and a cutoff status to control a current which goes through the transformer;
   a switch control circuit connected to the switch to control the switch be in the turn-on status or the cutoff status; and
   a voltage feedback circuit connected to the transformer and the switch control circuit, the voltage feedback circuit is used to drive the switch controlling circuit in accordance with the transformer's voltage and reduces a switching loss of the switch wherein the voltage feedback circuit comprises a first diode, a first Zener diode and a second Zener diode, a first capacitance, and a first to a seventh resistance.

2. The system as claimed in claim 1, wherein the system further comprising:

a current detected circuit connected to the switch and the switch control circuit, the current detected circuit is used to drive the switch control circuit in accordance with a current of the switch and control the switch be in the turn-on status or the cutoff status.

3. The system as claimed in claim 2, wherein the system further comprising:

a clamp circuit connected to the transformer and the filter in order to clamp a primary coil voltage of the transformer to a default value.

4. The system as claimed in claim 3, wherein the clamp circuit comprises a ninth diode, an eighteenth resistance, and an eighth capacitance.

5. The system as claimed in claim 2, wherein the current detected circuit comprises a seventh and an eighth diode, a fourteenth to a seventeenth resistance, and a sixth and a seventh capacitance.

6. The system as claimed in claim 1, wherein the rectifier comprises a second to a fifth diode.

7. The system as claimed in claim 1, wherein the filter is a Butterworth filter.

8. The system as claimed in claim 7, wherein the Butterworth filter comprises an eighth resistance, a second capacitance and a third capacitance, and a first inductance.

9. The system as claimed in claim 1, wherein the switch control circuit comprises a sixth diode, a ninth to a thirteenth resistance, a forth and a fifth capacitance, and a first and a second transistor.

* * * * *